(12) United States Patent
Heinze

(10) Patent No.: US 11,260,924 B2
(45) Date of Patent: Mar. 1, 2022

(54) HANDLEBAR TRANSPORT DEVICE

(71) Applicant: Carl Heinze, Eichenau (DE)

(72) Inventor: Carl Heinze, Eichenau (DE)

( * ) Notice: Subject to any disclaimer, the term of this patent is extended or adjusted under 35 U.S.C. 154(b) by 0 days.

(21) Appl. No.: 16/637,830

(22) PCT Filed: Aug. 8, 2018

(86) PCT No.: PCT/EP2018/000394
§ 371 (c)(1),
(2) Date: Feb. 10, 2020

(87) PCT Pub. No.: WO2019/029841
PCT Pub. Date: Feb. 14, 2019

(65) Prior Publication Data
US 2020/0172187 A1   Jun. 4, 2020

(30) Foreign Application Priority Data

Aug. 10, 2017 (DE) ........................ 10 2017 007 567

(51) Int. Cl.
*B62J 7/06* (2006.01)
*B62J 9/21* (2020.01)
(Continued)

(52) U.S. Cl.
CPC . *B62J 7/06* (2013.01); *B62J 7/08* (2013.01); *B62J 9/21* (2020.02); *B62J 11/00* (2013.01)

(58) Field of Classification Search
CPC ....... B62J 11/00; B62J 7/06; B62J 7/08; B62J 9/21; Y10T 24/314
(Continued)

(56) References Cited

U.S. PATENT DOCUMENTS 614,545 A * 11/1898 Goodspeed ............... A45F 5/02
224/463
757,892 A * 4/1904 Dales ......................... B62J 7/04
224/455
(Continued)

FOREIGN PATENT DOCUMENTS

DE         948 766 B    9/1956
FR       1 432 077 A    3/1966
(Continued)

*Primary Examiner* — Corey N Skurdal
(74) *Attorney, Agent, or Firm* — Volpe Koenig

(57) ABSTRACT

A device to fix a smaller object (a book, rolled up articles of clothing, a fabric bag, newspaper, lunch box or the like) to be transported securely on the handlebar and or the handlebar support of a vehicle, in particular a two-wheeled vehicle and more particularly a bicycle. The transport device has three fixing elements (3) which are fixedly attached to the handlebar (1) and/or the handlebar support (2). Each of the fixing elements (3) is provided with a retaining device (4) (ring, figure-of-eight ring, eye, tab or the like), through which a securing element (5) is movably fed. The fixing element (5) can be elastic (e.g. rubber or the like), or inelastic (e.g. cable, belt, tie-down strap, chain or the like). The fixing element (5) is fed twice through the retaining devices (4) such that an object can be fixed easily and then transported by being gripped between the at least two layers of the fixing element (5). The fixing element (5) can be fed through a cord stopper (6) and securely tied off with a knot or the like (7). The fixing element (4) can be tightened by the cord stopper (6), thus assisting, if necessary, in securing the object. The transport device has an extremely economical use of materials and is extremely low weight. The device does not significantly alter the appearance of the vehicle and can be fastened to the vehicle without drilling or adhesive bonding.

12 Claims, 1 Drawing Sheet

(51) Int. Cl.
*B62J 7/08* (2006.01)
*B62J 11/00* (2020.01)

(58) Field of Classification Search
USPC .................................. 224/436, 460, 463
See application file for complete search history.

(56) References Cited

U.S. PATENT DOCUMENTS

| | | | |
|---|---|---|---|
| 4,313,548 A | 2/1982 | Edelson | |
| 4,596,346 A * | 6/1986 | Lepage | B62J 7/02 |
| | | | 224/421 |
| 4,911,347 A * | 3/1990 | Wilhite | A45F 3/14 |
| | | | 224/251 |
| 5,395,018 A | 3/1995 | Studdiford | |
| 5,797,167 A * | 8/1998 | Schwab | B62J 7/08 |
| | | | 24/16 R |
| 5,803,328 A * | 9/1998 | Nakahara | B62J 11/00 |
| | | | 224/420 |
| 5,913,466 A * | 6/1999 | Revels | B62J 11/00 |
| | | | 224/421 |
| 7,036,189 B2 * | 5/2006 | Steigerwald | B60P 7/0823 |
| | | | 24/265 H |
| 7,275,669 B1 * | 10/2007 | Aikens | B62J 9/21 |
| | | | 224/420 |
| 7,634,842 B2 * | 12/2009 | Santisi | B62J 7/08 |
| | | | 24/131 R |
| 2004/0031834 A1 * | 2/2004 | Barr | B62J 9/21 |
| | | | 224/420 |
| 2007/0071568 A1 * | 3/2007 | Dorstewitz | B60P 7/0823 |
| | | | 410/97 |
| 2014/0231479 A1 * | 8/2014 | VanZanten | B62K 21/125 |
| | | | 224/441 |
| 2015/0344089 A1 * | 12/2015 | Bopanna | H01F 7/0252 |
| | | | 224/430 |

FOREIGN PATENT DOCUMENTS

| | | |
|---|---|---|
| JP | S5785381 | 5/1982 |
| JP | H06-51150 | 7/1994 |

* cited by examiner

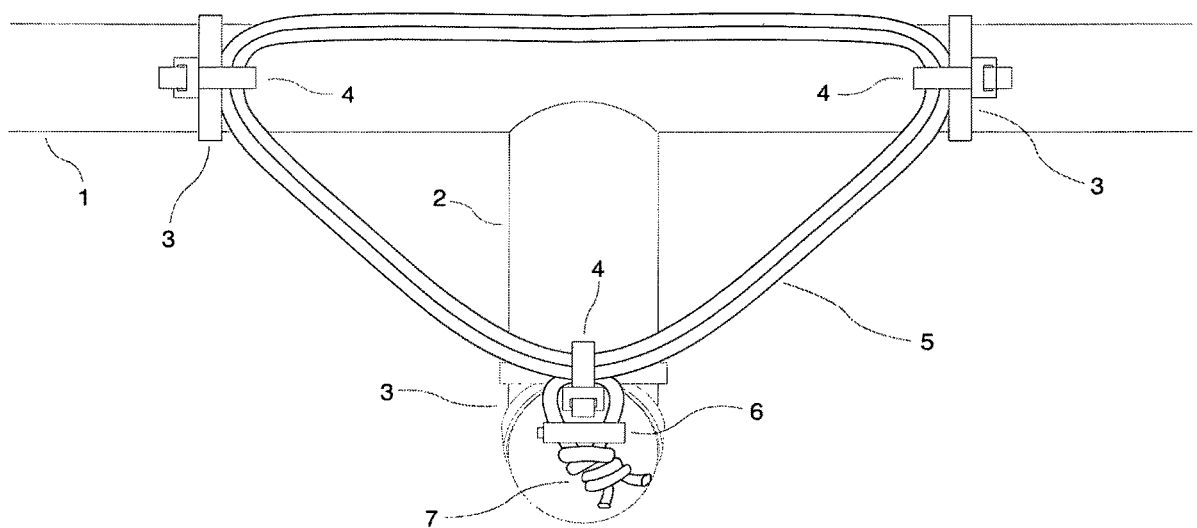

HANDLEBAR TRANSPORT DEVICE

TECHNICAL FIELD

The invention relates to a transport device for vehicles having handlebars, which allows a relatively small article (book, rolled-up garments, fabric bag, newspaper, lunchboxes, or the like) to be fixed and safely transported. The transport device is attached to the handlebar and/or the handlebar mount of a vehicle, particularly preferably of a two-wheeled vehicle, and even more particularly preferably of a bicycle. The transport device consists at least of three fastening elements, which, in the use position, are attached to the handlebar and/or to the handlebar mount of the vehicle, wherein the handlebar and the handlebar mount are connected rigidly together such that, during a steering movement, the handlebar and handlebar mount are movable together, and of a fixing element for fixing the article to be transported, wherein the at least one fixing element establishes in each case at least two connections between a first fastening element and a second fastening element and between a third fastening element and at least one other fastening element of the at least three fastening elements, wherein the at least three fastening elements are arranged in a manner spaced apart from one another in the use position of the transport device such that an area is defined between the at least three fastening elements.

BACKGROUND

In principle, various transport devices for two-wheeled vehicles and in particular bicycles are known:
- racks, which are usually manufactured from wire or tubing and are generally fixedly mounted over the rear wheel and allow the transported material to be fixed to the supporting surface of the rack by spring flaps or bungee cords.
- bicycle baskets, which are usually manufactured from wire or tubing and are mounted on a rack or directly on the handlebar by way of a mount.
- panniers, which are usually manufactured from textile and are generally attached laterally to a rack.
- saddlebags, which are usually manufactured from textile and are generally attached under the saddle of a two-wheeled vehicle.

A drawback of fixedly mounted transport devices, such as racks or bicycle baskets, is that they generally have a relatively large dead weight that has to be carried along even when nothing is being transported during a journey.

A drawback of transport devices that are removable in a relatively problem-free manner, such as panniers or saddlebags, is that it is always necessary to decide, before starting a journey, whether something will need to be transported, and that it is frequently necessary to repeat the attaching or removing operation.

A drawback of all the abovementioned and other previously known transport devices is that they have a relatively large impact on the appearance of the vehicle. In particular in the case of vehicles that are equipped in a very minimalistic manner for esthetic reasons, the abovementioned and other previously known transport devices can be considered very disruptive.

SUMMARY

Due to the abovementioned drawbacks, the object is to create a transport device that is as lightweight as possible and changes the appearance of the vehicle as little as possible.

The object on which this invention is based can be achieved by a transport device with one or more features of the invention. According to the invention, to achieve the object, the transport device that uses the handlebar and/or handlebar mount that is already present on a vehicle, particularly preferably a two-wheeled vehicle, and even more particularly preferably a bicycle, as substructure, and moreover that it require only very few and, moreover, very lightweight additional components, namely at least three fastening elements and at least one fixing element.

It may be expedient for the fixing element to be formed from an elastomer, in particular a rubber. This has the advantage that the transported material can be fixed more easily.

It may be expedient to guide the at least one fixing element through the fastening elements at least twice. This means that it may be expedient for in each case at least two connections to be formed in each case between two adjacent fastening elements of the at least three fastening elements using the fixing element, preferably wherein the at least one fixing element establishes in each case at least two connections between the first fastening element and the second fastening element, in each case two connections between the second and the third fastening element, and in each case at least two connections between the third and the first fastening element of the at least three fastening elements.

It may be expedient for the at least one fixing element to be in the form of a cord and/or of a band and/or of a lashing strap and/or of a chain.

It may be expedient for the fastening elements each to have at least one retaining device for retaining the at least one fixing element, the at least one fixing element being guided in a movable manner on or in said retaining device and/or the at least one fixing element being fixedly connected to said retaining device, preferably wherein the at least one retaining device is formed as a part selected from the group consisting of a ring, an 8-ring, an eyelet and/or a loop. This has the advantage that the transported material can be fixed more easily.

It may be expedient for the transport device to have at least one tensioning device, in particular at least one tensioning device in the form of a cord stopper, by which tensioning device the tension in the at least two connections between at least two fastening elements is settable. This has the advantage that the transported material can be fixed more easily.

It may be expedient for the at least one fixing element to form at least one, in particular closed, polygon, preferably at least one triangle or quadrilateral, between the at least three fastening elements.

It may be expedient for the at least two connections between the first fastening element and the second fastening element and between the third and the at least one further fastening element of the at least three fastening elements to be able to define a space in the use position, into which space the article to be transported is introducible and is fixable by tightening the individual connections. This has the advantage that the transported material can be fixed more easily.

It may be expedient for the transport device to have at least four or at least five fastening elements and/or a plurality of fixing elements, in particular one fixing element for each connection between two fastening elements.

It may be expedient for the first and the second fastening element to be provided for fastening to the handlebar, and for the third fastening element of the at least three fastening elements to be provided for fastening to the handlebar mount.

It may be expedient for the at least one fixing element to have a sheathing. This has the advantage that the transported material can be fixed in a nonslip and clean manner.

It may be expedient for at least one of or all of the at least three fastening elements to be in the form of cable ties or to have a cable tie. This has the advantage that the fastening elements can be fastened to the handlebar and/or handlebar mount without drilling or adhesive bonding.

The transport device according to the invention as described and claimed herein is suitable in particular for attaching to a handlebar and/or to a handlebar mount of a vehicle, in particular of a two-wheeled vehicle, preferably of a bicycle, and for transporting an article that is clamped in place and thus fixed in each case between the in each case two connections.

BRIEF DESCRIPTION OF THE DRAWINGS

An exemplary embodiment of the invention is described in more detail in the following text with reference to a drawing.

DETAILED DESCRIPTION

The drawing shows a plan view from above of how an exemplary embodiment of the transport device is attached to a handlebar and a handlebar mount. The shown exemplary embodiment of the transport device consists of three fastening elements 3, which are fixedly attached to the handlebar 1 and the handlebar mount 2. The handlebar 1 and the handlebar mount 2 are connected rigidly together such that, during a steering movement, the handlebar 1 and handlebar mount 2 move together. The handlebar 1 and handlebar mount 2 are not part of the proposed invention and are illustrated in the drawing only for illustrative purposes. Located, as holding device, on each of the fastening elements made of cable ties 3 is a loop made of cable ties 4. Guided through the loops 4 is a fixing element 5, which is in the form of a rubber cord in this exemplary embodiment. The fixing element 5 is guided through the loops 4 twice such that an article can be fixed without great effort and then transported in that the article is clamped between the fixing element 5. The fixing element is guided through a cord stopper 6 and tightly closed by a knot. Using the cord stopper 6, the fixing element 5 can be tensioned, this supporting the fixing of the article if necessary.

LIST OF REFERENCE SIGNS

1 Handlebar (only for illustration, not part of the invention)
2 Handlebar mount (only for illustration, not part of the invention)
3 Fastening elements
4 Holding devices (loops)
5 Fixing element (rubber cord)
6 Cord stopper
7 Knot

The invention claimed is:

1. A transport device for transporting an article, the transport device is designed for attaching to at least one of a handlebar or a handlebar mount of a vehicle, the transport device comprising at least three fastening elements for fastening the transport device, in a use position, to the at least one of the handlebar or to the handlebar mount, and at least one fixing element for fixing the article to be transported, the at least one fixing element passes through each of the fastening elements in a movable manner and at least twice, thereby establishing in each case at least two connections between two adjacent ones of the fastening elements of the at least three fastening elements such that the article is adapted to be clamped in place and fixed in each case between the at least two connections, and the at least three fastening elements are arranged spaced apart from one another in the use position of the transport device such that an area is defined between the at least three fastening elements, and the at least one fixing element comprises at least one of a cord, a band, a lashing strap, or a chain.

2. The transport device as claimed in claim 1, wherein the at least one fixing element is formed in an elastic manner.

3. The transport device as claimed in claim 1, wherein the fastening elements each have at least one retaining device for retaining the at least one fixing element, the at least one fixing element being at least one of guided in a movable manner on or in said retaining device, or being fixedly connected to said retaining device.

4. The transport device as claimed in claim 1, further comprising at least one tensioning device, by which a tension in the at least two connections between at least two fastening elements is settable.

5. The transport device as claimed in claim 1, wherein the at least one fixing element forms at least one polygon between the at least three fastening elements.

6. The transport device as claimed in claim 1, wherein the at least two connections between the first fastening element and the second fastening element and between the third and the at least one further fastening element of the at least three fastening elements define a space in the use position, into which space the article to be transported is introducible and is fixable by tightening the individual connections.

7. The transport device as claimed in claim 6, wherein there are at least four of the fastening elements and a plurality of fixing elements, with one of the fixing elements for each said connection between two of the fastening elements.

8. The transport device as claimed in claim 7, wherein the first and the second fastening elements are each provided for fastening to the handlebar, and the third fastening element of the at least three fastening elements is provided for fastening to the handlebar mount.

9. The transport device as claimed in claim 1, wherein the at least one fixing element has a sheathing, and at least one of the at least three fastening elements comprises a cable tie.

10. The transport device as claimed in claim 1, wherein at least one of the at least three fastening elements is fastened to the handlebar in the use position by a rubberized or coated, nonslip hook-and-loop fastener.

11. A method of using the transport device as claimed in claim 1 for transporting an article on at least one of the handlebar or on the handlebar mount of a vehicle having a handlebar, comprising installing the transport device on the at least one if the handlebar or the handlebar mount.

12. A method for transporting an article on at least one of a handlebar or a handlebar mount of a vehicle, comprising providing the transport device as claimed in claim 1, attaching the at least three fastening elements for fastening the transport device to at least one of the handlebar or the handlebar mount, whereby the at least one fixing element passes through each of the fastening elements in a movable manner and at least twice, thereby establishing in each case at least two connections between two adjacent ones of the fastening elements of the at least three fastening elements such that the article is adapted to be clamped in place and fixed in each case between the at least two connections, and clamping the article in place and fixing the article in each case between the two connections.

\* \* \* \* \*